Oct. 21, 1930.  J. C. CANDAR  1,779,207
BATTERY CARRIER
Filed Jan. 31, 1929  2 Sheets-Sheet 2
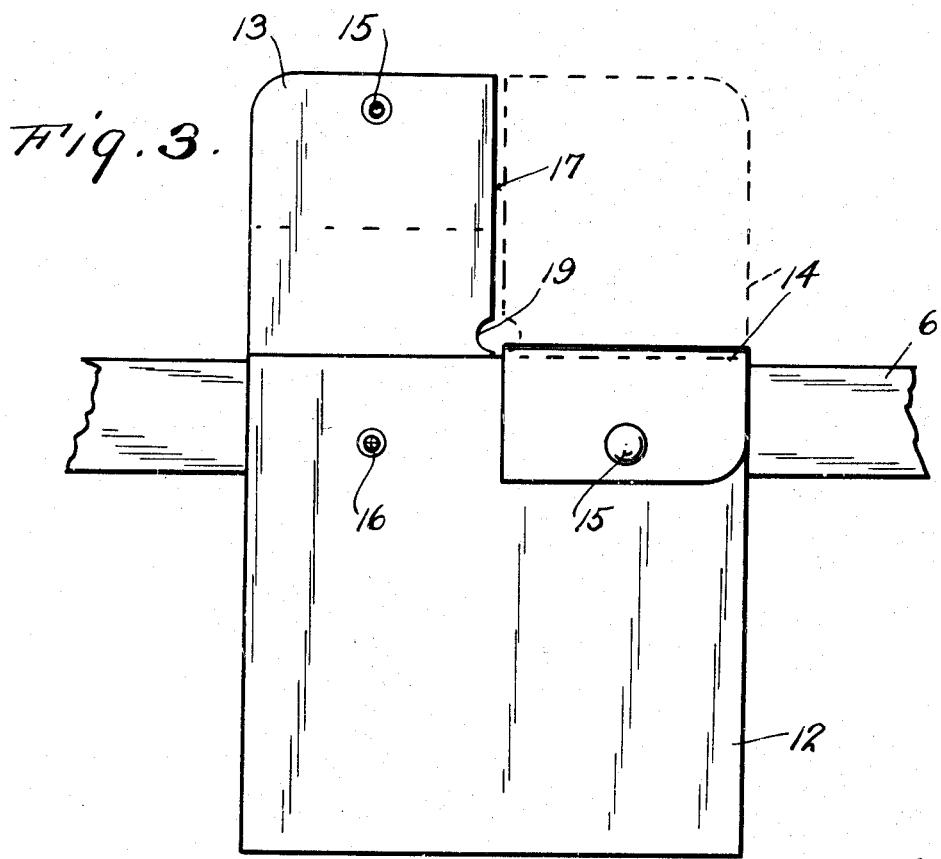
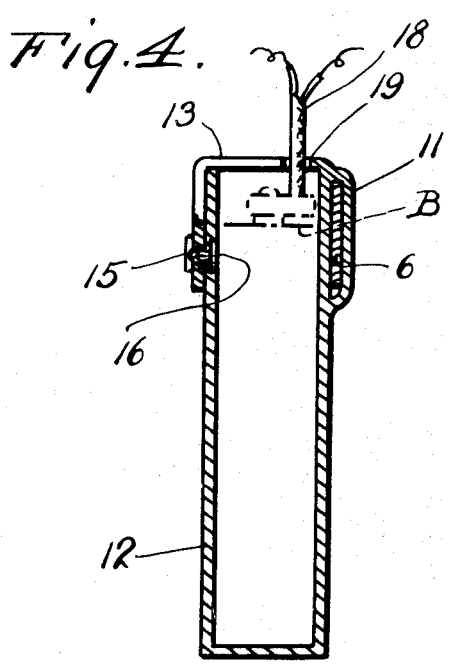
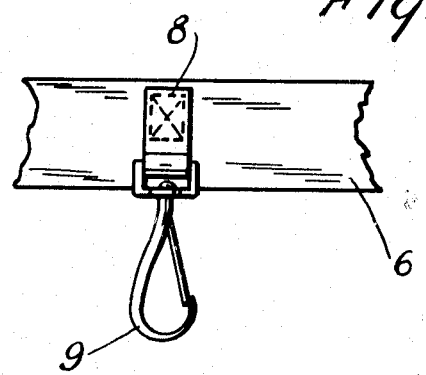
Inventor
John Coplin Candar
By Clarence A. O'Brien
Attorney

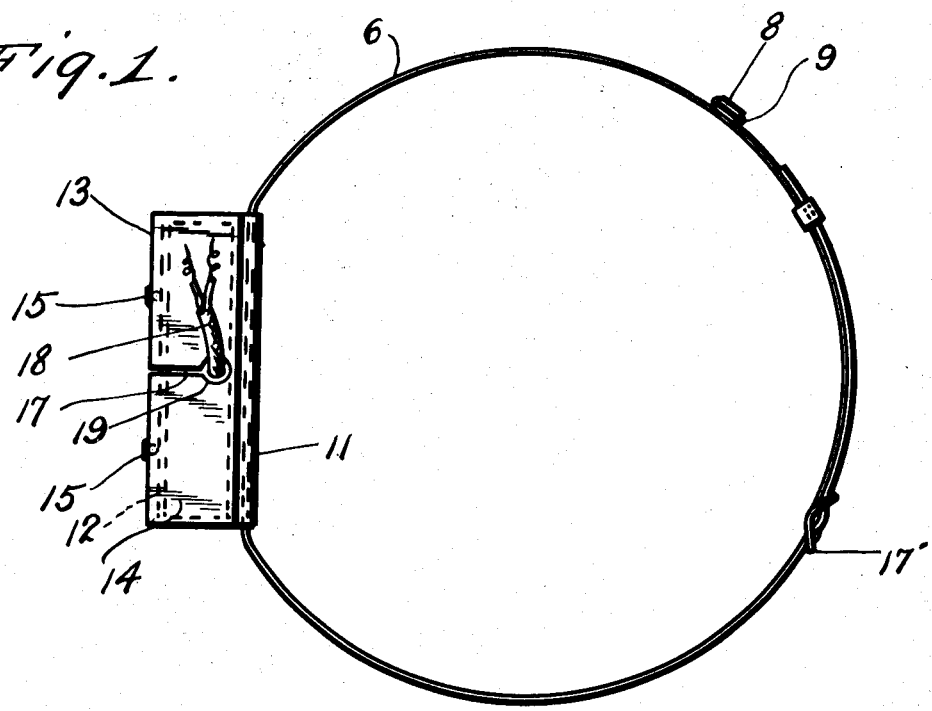
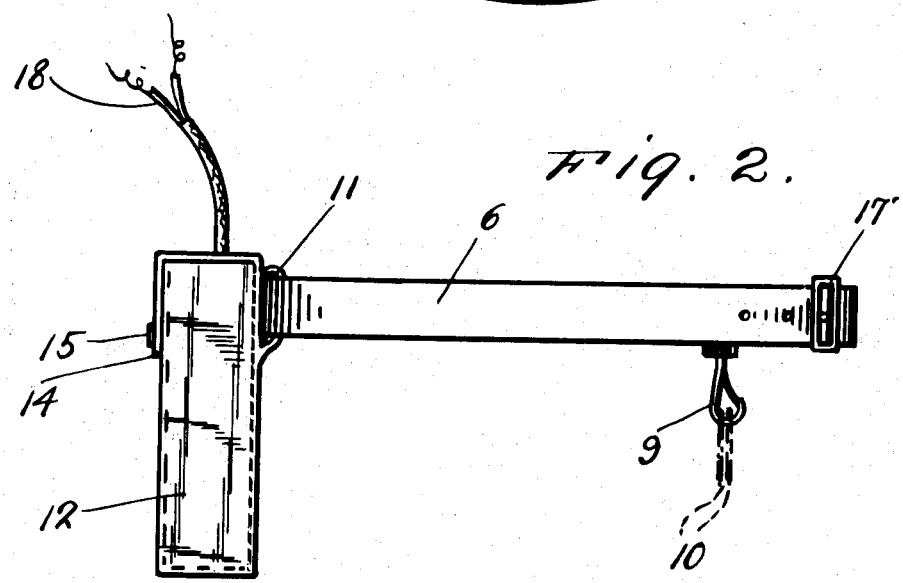

UNITED STATES PATENT OFFICE

JOHN COPLIN CANDAR, OF ARNOLD, PENNSYLVANIA

BATTERY CARRIER

Application filed January 31, 1929. Serial No. 336,621.

This invention relates to an appliance for personal use, such as may be conveniently and briefly entitled a Battery carrier.

More specifically stated, the invention has reference to an appliance which is especially constructed to be worn by coal miners and the like, in cases where it is necessary to carry a battery to provide a source of electrical current supply for operating a headlight, portable light or the like.

Briefly described, the invention comprises a body encircling element, preferably in the form of a buckle-belt, together with an especially designed battery bag, slidably attached thereto, and so made as to accommodate a miniature storage battery.

My principal aim is to provide a structure of this class which is unusually simplified, economical to both the manufacturer and user, efficient in use, and characterized by unusual safety to the wearer.

Other features and advantages of the invention will become more readily apparent from the following description and drawings.

In the drawings:

Figure 1 is a top plan view of an appliance constructed in accordance with the present invention.

Figure 2 is a side elevational view of the same.

Figure 3 is an enlarged view of the bag and a portion of the belt to which it is attached.

Figure 4 is a vertical sectional view through the bag and belt.

Figure 5 is a fragmentary detail view of a snap-hanger for identification tags and the like.

In carrying out the invention, I provide a leather belt 6, having a connecting buckle 7. Attached by a short strap 8 to this belt, as seen in Figure 5, is a snap fastener or clip 9, to accommodate metal tags 10, such as are worn by coal miners and the like.

Slidably mounted on the belt through the medium of an attaching loop 11 is a substantially rectangular leather bag 12, made to accommodate a miniature storage battery 13, as shown in dotted lines in Figure 4. Cooperable with the open top of this bag is a closure made up of complemental duplicate flap sections 13 and 14. Each flap or section is provided with a snap fastener 15, cooperable with the retaining stud 16, whereby the flaps may be closed as shown in Figure 2, to hold the battery in place. The adjacent longitudinal edges 17 of these sections are spaced apart to accommodate the battery conduit or cable 18 and there are opposed notches 19 which form a circular hole through which the cable or conduit passes as seen in Figure 4.

The container or bag for the battery is constructed of insulation material and when the flaps are closed, this keeps the battery terminals from coming into contact with any other electrical appliances or conductors. Moreover, it provides an enclosure which prevents battery fluids from coming into contact with the wearing apparel of the user. It is adjustable on the belt, in order that it may be arranged in the most comfortable and convenient position. Moreover, by being mounted on a belt it may be comfortably placed on the body of the user in a comfortable position.

The gist of the invention is in providing a body encircling belt, such as may be readily placed in position and upon which bags of leather or other insulation material are adjustably mounted and constructed to accommodate a miniature storage battery such as is used by a coal miner at the present time; the bag being characterized by side by side top closure flaps extending from the back wall of the bag, said flaps having front fastening means and also having in their meeting edges notches which form above the mouth of the bag an opening for the passage and play of the battery conduit. Manifestly the closure flaps characterized as stated lend themselves to ready insertion and removal of the battery, and also accommodate themselves to the battery conduit incident to the insertion or removal of the battery as well as when the battery is in the bag and the flaps are fastened in their closed position. The principal feature of the invention is, of course, safety to the wearer.

These and other features and advantages of the invention have doubtless been made apparent in the description and drawings. Therefore a more lengthy description is regarded as unnecessary.

Minor changes in the shape, size, and rearrangement of details coming within the field of invention claimed, may be resorted to, in actual practice, if desired.

I claim:

An appliance for use on the body of a miner, including essentially a belt with means for fastening the same about the body, and a battery-carrying bag arranged outside of the belt and pendent therefrom and having a loop at the inner side of its upper portion loosely receiving the belt, and also having side by side top closure flaps, flexibly mounted on and extending from the back wall of the bag, and front fastening means for the closure flaps; the said closure flaps having in their meeting edges notches forming above the mouth of the bag an opening for the passage and play of a battery conduit.

In testimony whereof I affix my signature.

JOHN COPLIN CANDAR.